United States Patent [19]

Petrik et al.

[11] Patent Number: 5,009,796
[45] Date of Patent: Apr. 23, 1991

[54] METHODS AND APPARATUS FOR TREATING A MIXTURE OF PARTICLES AND FLUIDS

[75] Inventors: Michael A. Petrik, Highland Heights, Ohio; Robert J. Adler, 3068 Van Aken Blvd., Cleveland, Ohio 44120; Jonathan D. Wineland, Madison, Ind.

[73] Assignee: Robert Adler, Cleveland, Ohio

[21] Appl. No.: 843,055

[22] Filed: Mar. 24, 1986

[51] Int. Cl.$^5$ .............................................. B04C 7/00
[52] U.S. Cl. ................................ 210/787; 210/511; 210/512.3; 422/140; 422/147; 422/230; 422/231; 422/269; 261/93; 415/121.1; 415/169.1; 415/169.2; 209/159; 55/95; 55/256
[58] Field of Search .............. 210/407, 767, 768, 787, 210/789, 511, 634, 635, 512.1, 512.3; 366/273, 293, 325, 330, 165, 168, 155; 209/459, 461, 158, 159; 55/95, 255, 256; 415/121.2, 169.1, 169.2; 261/87, 93; 422/140, 147, 230, 231, 269

[56] References Cited

U.S. PATENT DOCUMENTS

| | | | |
|---|---|---|---|
| 1,338,698 | 5/1920 | Richardson | 422/231 |
| 2,845,936 | 8/1958 | Boynton et al. | 422/269 |
| 2,917,372 | 12/1959 | Wallin | 422/231 |
| 3,012,977 | 12/1961 | Wilson et al. | 366/293 |
| 3,347,371 | 10/1967 | Verbaere | 209/172 |
| 3,404,778 | 10/1968 | Woodruff et al. | 210/787 |
| 3,494,597 | 2/1970 | Rosinger | 366/273 |
| 3,635,342 | 1/1972 | Mourlon et al. | 210/787 |
| 3,771,654 | 11/1973 | Meissner | 210/84 |
| 3,814,395 | 6/1974 | Kaelin | 261/93 |
| 3,865,725 | 2/1975 | Condolios | 210/73 |
| 3,932,284 | 1/1976 | Howe | 210/523 |
| 4,135,852 | 1/1979 | Archibald | 415/121.2 |
| 4,161,103 | 7/1979 | Horgan et al. | 60/39 |
| 4,177,636 | 12/1979 | Horgan | 60/39 |
| 4,337,156 | 6/1982 | de Rosset | 210/690 |
| 4,381,849 | 5/1988 | Conant | 494/43 |
| 4,382,073 | 5/1983 | Krogsrud | 266/168 |
| 4,508,455 | 4/1985 | Lerman et al. | 366/330 |
| 4,541,724 | 9/1985 | Cornelissen | 366/293 |
| 4,541,991 | 9/1985 | Krogsrud | 422/269 |
| 4,563,123 | 1/1986 | Beck | 415/52 |
| 4,580,503 | 4/1986 | Astrom | 110/216 |
| 4,613,344 | 9/1986 | Henrich et al. | 48/77 |
| 4,623,470 | 11/1986 | Adler | 210/787 |
| 4,650,578 | 3/1987 | Cerdan et al. | 210/197 |
| 4,779,990 | 10/1988 | Hjort et al. | 261/93 |
| 4,882,098 | 10/1989 | Weetman | 261/93 |
| 4,900,480 | 2/1990 | Litz et al. | 261/93 |

OTHER PUBLICATIONS

Petrik et al., Impeller Fluidized Beds, AIChE Annual Meeting, Nov. 11–14, 1985.

(List continued on next page.)

Primary Examiner—W. Gary Jones
Assistant Examiner—Matthew O. Savage
Attorney, Agent, or Firm—Woodling, Krost & Rust

[57] ABSTRACT

A method and apparatus for exposing particles to a fluid including the steps of adding fluid and particles to a container having impeller means therein, generating a current with the impeller so as to subject the particles to centrifugal and convective forces resulting in the formation of a well-defined and localized fluidized bed of particles, and maintaining the existence of the current through the fluidized bed so that the particles are thereby exposed to the fluid. The fluidized bed is located in a region removed from the impeller when the particles are more dense than the fluid, and the fluidized bed is located in a region near the impeller when the particles are less dense than the fluid. A method of exposing a first fluid to a second fluid, the second fluid being either a gas or a liquid immiscible in the first fluid is also disclosed. The method includes the steps of adding the first and second fluids to a container having impeller means therein, generating with the impeller a current in the first fluid which subjects the second fluid to centrifugal and convective forces resulting in the formation of a well defined and localized bed of a dispersed phase of the second fluid remaining in a region near the impeller, and maintaining the existence of the current through the region so that the dispersed phase in the fluidized bed is exposed to the first fluid.

28 Claims, 3 Drawing Sheets

OTHER PUBLICATIONS

Balasko et al., Particle-Fluid Mass Transfer Coefficients in Impeller Fluidizers, AIChE Annual Meeting, Nov. 2-7, 1986.

*Chemical Engineers' Handbook*, John H. Perry Editor, Fourth Edition, 1963, p. 17-2.

Klumpar, I. V. et al., "Air Classifiers", *Chemical Engineering*, Mar. 3, 1986, pp. 77-92.

Cronan, Calvin S., Ed., "Cyclone Has Built in Pump", *Chemical Engineering*, Nov. 1953, pp. 212-213.

Tangel, O. F. et al., "Wet Cyclones", *Chemical Engineering*, Jun. 1955, pp. 234-238.

Mori, Y. et al., "On the Characteristics of a Centriclone", *Chem. Eng. Japan*, 22, 1 (1958) pp. 7-14.

Wills, B. A., *Mineral Processing Technology*, 3rd Edition, 1985, pp. 350-356.

METHODS AND APPARATUS FOR TREATING A MIXTURE OF PARTICLES AND FLUIDS

This invention relates to the treatment of fluids having particulate matter suspended or otherwise contained therein. In particular, it relates to devices and methods for treating particle-carrying liquids so as to pump the liquids, to wash, leach or concentrate the particles, or to separate the particles from the liquid or from each other.

BACKGROUND OF THE INVENTION

Many prior art inventions have been directed to the processing of slurries, fluidized beds, and the like, and especially to the separation of fine particles, sometimes called "fines", from a mixture of such particles and a fluid, for example as a slurry of fine particles in a fluid in which the particles are suspended. It is sometimes desired to remove from particles any film or coating on the particles suspended in a fluid by washing away the material of the film or coating with the fluid from which the particles have been separated. It is also sometimes desired to remove soluble components from particles by leaching the components into a surrounding fluid. Another need which occurs frequently is to contact fluid reactants with catalyst particles for the purpose of promoting chemical or biochemical reactions. Further desires are to be able to pump mixtures of particles and fluid, and to conduct particle formation and growth, such as in crystallization.

Among this prior art is the process and apparatus disclosed in co-pending U.S. patent application Ser. No. 319,132, of Robert J. Adler, filed Nov. 9, 1981, and the following published articles, copies of which are being supplied under Patent Office Rule 1.56.

1. Article in "Chemical Engineering" for November, 1953, pages 212-213.
2. Article in "Chemical Engineering" for June, 1955, pages 234-238.
3. Mori, Y., et al., "On the Characteristics of a Centriclone" Chem. Eng. Japan 22, 7 (1958). accompanied by nine pages of handwritten translation into English.
4. Description of cyclones and "Dyna Whirlpool", pages 350 to 356, Mineral Processing Technology, 3rd Edition, Pergamon Press (1985).
5. Klumpar, I. V., et al., "Air Classifiers", Chemical Engineering, Mar. 3, 1986, pp. 77-92.

The prior art devices are primarily directed to separation and are not suited to the simultaneous performance of the other functions listed above, which are generally performed by other means. Moreover even the prior art separation apparatus suffers from a number of disadvantages. For example, in the typical centriclone, the slurry must often be pumped in at high speeds, causing wear upon the pumping apparatus, the centriclone, especially its impeller and impeller region, and/or the particulate matter. Wear on apparatus is a problem when the particulate matter is sharp silica or the like; conversely, the centriclone separation process is destructive of softer particles, which may make further concentration or processing difficult.

Another disadvantage of prior art devices is that they are not self-pumping and require external pumps in inflow and/or outflow streams. These additional pumps represent complexity and are subject to wear when abrasive particles are being processed.

There is a need for apparatus which avoids the various disadvantages of the centriclone and similar separation devices, which is simple and robustly constructed, subject to minimum wear, causes minimal particle attrition, is self-pumping, and can be adapted to perform a variety of processing tasks.

SUMMARY OF THE INVENTION

The apparatus of the present invention is a combined pump and slurry processor. Its operation will be described as it relates to a slurry, that is, a mixture of particles and a less dense liquid. However, as will be seen hereinafter, its use is not restricted to that situation.

The device of the present invention produces a region of more concentrated slurry, by means of a rotating impeller. The impeller, located in a generally cylindrical container filled with the original slurry, generates rotational and secondary longitudinal currents in that slurry. The rotational component causes centrifugal force radially outward toward the confining walls of the container. The impeller also generates a convective flow, axially away from the impeller along the cylinder walls, radially inward when a barrier is met, axially toward the impeller in the interior of the cylinder, and radially outward near the impeller. The separation of the particles results from the interaction of these phenomena.

The centrifugal force caused by the swirling flow moves the particles radially outward. The secondary flow sweeps the particles longitudinally along the cylindrical walls away from the rotating impeller and to the point where the convective current turns radially inward. The particles remain near the axially confining walls because the outward centrifugal body force, under proper conditions, is greater than the inward drag surface force. There is thus formed a concentrated rotating toroidal fluidized bed of particles at a longitudinal distance from the plane of the rotating impeller.

At high impeller rotation rates, the fluidized bed becomes smaller and narrower in longitudinal extent and more sharply defined.

Thus, the invention produces locally confined fluidized beds of fine particles. The particles are held dynamically within a subregion of the cylindrical container by the interaction of centrifugal force and convection longitudinally of the container, both produced by impeller-driven flow. The fluidized bed is maintained adjacent to clear fluid without mechanical barriers such as screens.

The rotating impeller also allows the apparatus to develop sufficient pressure to permit pumping of the fluid and/or slurry streams into and out of the vessel without external, separate pumps. The pressure is developed by the kinetic energy of the swirling flow and the centrifugal body force. Both forces contribute approximately equally to the total outlet pressure. A 6 inch diameter vessel with a 4 inch diameter agitator swirling at 2500 rpm filled with water develops a pressure head of approximately 15 psi. The pressure within the device is minimum at the central axis and maximum at the wall. The pressure is greatest at the wall near the impeller but there is also sufficient pressure adjacent to the wall far from the impeller, allowing both fluid and slurry to be pumped simultaneously.

The phenomenon occurs with pitched as well as flat blade impellers, and with frustro-conical as well as cylindrical containers. Ports are usually provided in appropriate locations on the cylinder walls so that the concentrated slurry and/or particle free fluid can be removed or added. Ports for slurry addition may be provided at a distance from the impellers in the cylinder walls, so that contact of the particles with mechanical surfaces is avoided. The phenomenon is little affected by flows through feed and exit ports. The direction of impeller rotation and orientation in the earth's gravitational field are unimportant at high impeller speeds. A wide range of geometries, speeds, particle sizes, and slurry concentrations are workable.

The phenomenon is robust and it is believed to be able to handle particles at least ten times smaller than the lower limit in conventional fluidization without entrainment losses in outflowing fluid streams. Mass transfer controlled processes, it is believed, may possibly be reduced in volume by a factor of up to 100, the gain coming from the higher surface area of smaller particles and their more favorable mass transfer coefficients. A somewhat related phenomenon may be expected to occur in a centriclone with an impeller; however, a centriclone's taper does not permit the formation of a large volume of fluidized bed, and it is not well adapted to other forms of processing, in particular because it is not self-pumping, and because its porting is not arranged to minimize mechanical abrasion of the particles and the equipment.

By adjusting various parameters such as the impeller speed, and the relative densities of carrier liquid and particulate matter, different kinds of separations may be performed. In particular, the device may be used to separate mixtures of particles by either their densities or their sizes. The apparatus also lends itself readily to countercurrent processes for the washing or leaching of the entrained particles or for the controlled exposure of the solids to solutes in the carrier liquid, for chemical reaction. Moreover, the carrier fluid need not be a liquid; for example, at sufficiently high impeller speeds, particles may be separated from a low density gas phase such as air.

Accordingly, it is an object of the present invention to provide a versatile apparatus for many types of processing of fluids carrying particulate matter.

A further object of the invention is to provide improved apparatus and methods for the concentration or separation of particulate matter carried by fluids.

Another objective of the invention is to provide an improved apparatus and methods for the contacting of particles with fluid for purposes such as washing, leaching and reaction.

Yet another object of the invention is to provide improved apparatus and methods for the pumping and processing of liquids carrying particulate matter, which pumping and processing is accomplished while subjecting the particulate matter and the apparatus to minimal mechanical stress.

Other objects and a fuller understanding of the invention may be had by reference to the following diagrammatical drawings, in which.

Figure 1:
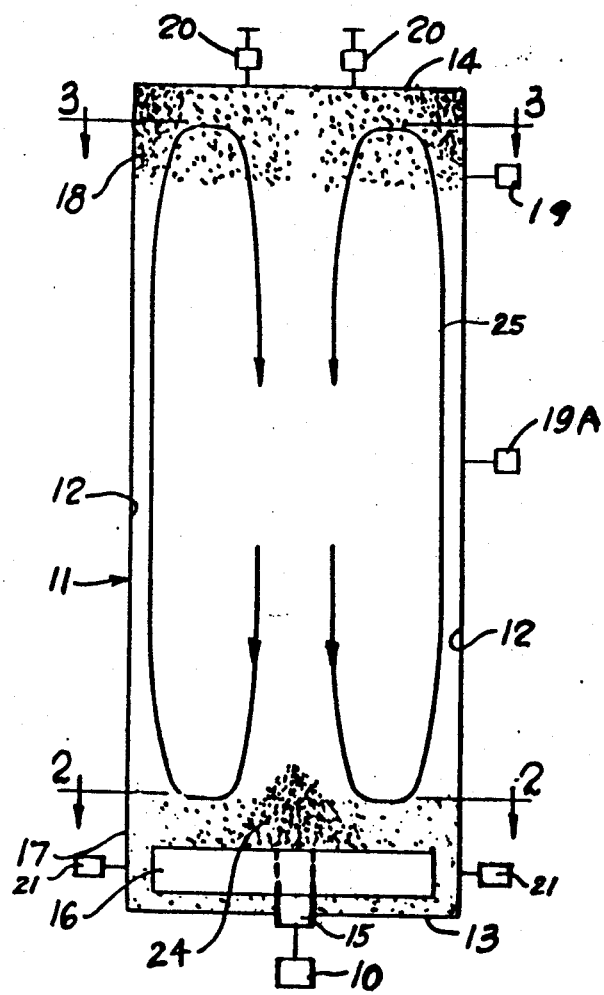
FIG. 1 is a side elevational view, partly in section, of a preferred embodiment of the apparatus of the invention separating particles which are more dense and less dense than a fluid.
Figure 4:
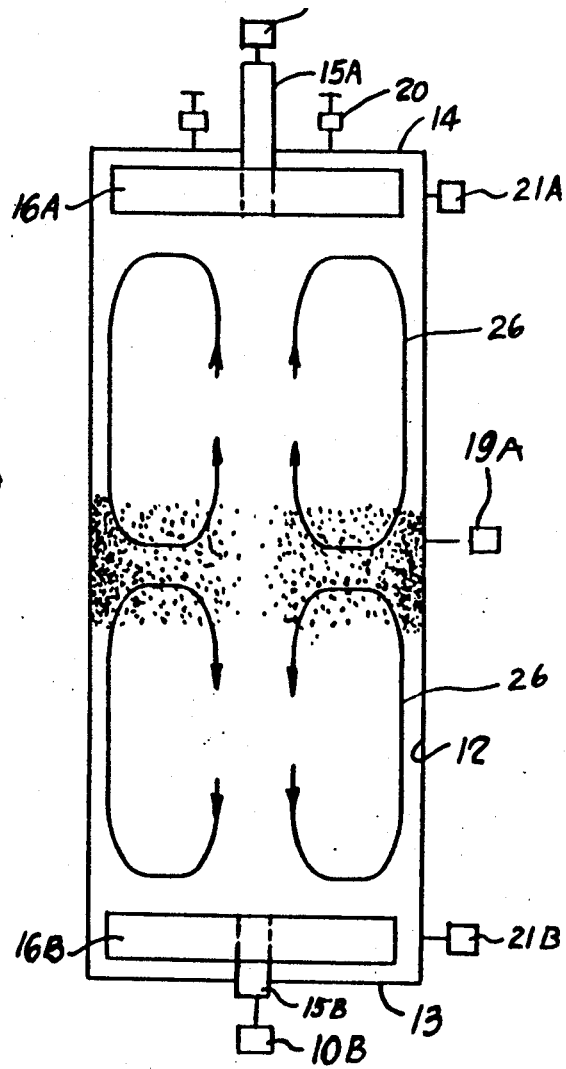
Figure 3:
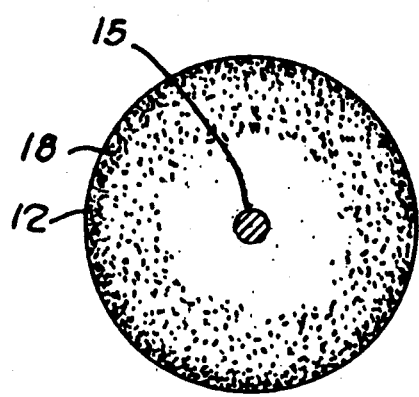
FIG. 3 is a cross-sectional view through the line 3—3 of FIG. 1, and showing the distribution of particles more dense than the carrier fluid.
Figure 2:
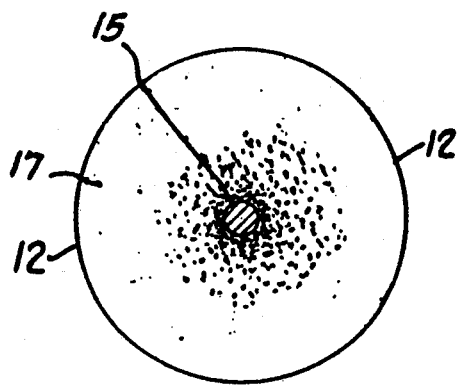
FIG. 2 is a cross-sectional view through the line 2—2 of FIG. 1, and showing the distribution of particles less dense than the carrier fluid.
Figure 5:
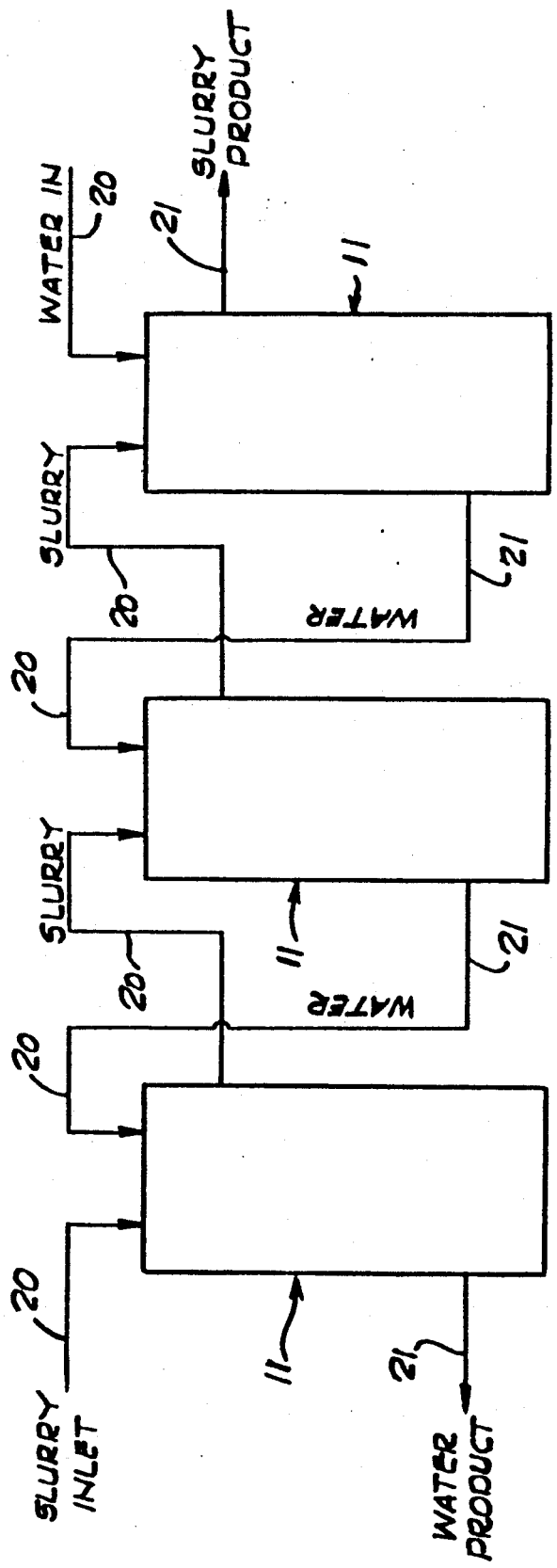

FIG. 4 diagrammatically shows another embodiment, which includes a pair of axially spaced impellers in the cylindrical container;

and FIG. 5 diagrammatically illustrates an arrangement of a plurality of devices like that shown in FIG. 1 but connected in series to operate in a cascade manner.

In one device embodying our invention, as shown in FIG. 1, the container 11 has sidewalls 12 concentric with the axis of the container, and opposite end walls 13 and 14 to provide a closed cylindrical container.

A shaft 15 extends longitudinally through the end wall 13 along the axis of the container. A driving means 10 such as a motor operatively connected to the shaft 15 is provided for rotating the shaft 15 at the desired speed.

Splined or otherwise secured to the shaft 15 so as to be driven thereby is an impeller 16. Rotation of the shaft 15 by the driving means 10 causes the impeller to rotate about the axis of the container. Alternatively, it may be desired to provide a rotating stirrer, similar to those well-known in the art, which is not driven by a shaft but by an externally imposed magnetic field. Such a stirrer may be affixed to the apparatus by an axle arrangement which maintains its horizontal position, or in some applications it may simply rest on an end wall of the container. The blades of impeller 16 spreading radially outward of the axis of shaft 15 may be straight, curved, tilted or inclined.

Particles, such as sand, suspended in a fluid, such as water, are introduced into the container 11 through inlet valve opening 20.

The rotating impeller 16, by centrifugal force and swirling action, throws or casts the slurry, and particularly the heavier or denser particles of the slurry, radially outward toward the confining walls 12 of the container 11.

The rotating impeller 16, by also inducing a secondary longitudinal flow along the container walls 12 away from the impeller 16, convects the particles collected adjacent to the container wall 12 toward end wall 14. The direction of the convective flow is indicated by the curved line 25 within the container. The curved line 25 does not indicate the path of the slurry because the flow is the resultant of both the swirling and the secondary longitudinal flows. The flow path, which is the vector sum of the swirling and secondary flows, is actually two coaxial helices.

The longitudinal extent of the upwardly spiralling flow of the slurry, induced by the spinning impeller, depends upon a number of variables, including the rotational speed of the impeller 16 and the dimensions of the container 11 and the impeller 16. These variables are preferably so selected and controlled that the upward convective forces suffice to bring the slurry to the upper end 14 of the container. In region 18 the slurry is turned radially inward toward the axis of the container 11. There the slurry is stripped of its particles by the centrifugal force field, and the resulting particle-free fluid is convected or directed downwardly, and spirals back toward the plane of the rotating impeller 16.

The rotational speed of impeller 16 must be of such magnitude that, for the particular dimensions of a container 11 and impeller 16, the slurry is moved longitudinally to region 18, or to such other barrier as may be established at a longitudinal distance from the plane of the rotating impeller. The speed is preferably continuously adjustable.

As the operation of the impeller continues, particles in the slurry which are substantially denser than the carrier liquid tend to concentrate in region 18 and particularly around the periphery thereof. This phenomenon occurs when the convective drag force urging the particles inward is exceeded by the centrifugal body force urging the particles outward. This depends on the interaction of a number of variables, as will be discussed below, but one skilled in the art easily determines suitable conditions empirically. The fluidized bed of slurry in region 18 rotates around the axis of the container. The centrifugal force of the rotating bed in region 18 imparts centrifugal force on the particles to cause them to accumulate nearest the confining wall 12 near the top of the container. Thus, the particles, such as sand, of a slurry tend to collect in region 18 and near the top of the container.

The water or other solvent stripped of particles by the described action collects in region 17 adjacent the bottom of the container. Particles thusly removed from the slurry and collecting in region 18 may be withdrawn through valved outlet 19 from the container 11. Water or other solvent from which fine particles have been removed from the bottom portion of the container may be withdrawn through valved outlet 21.

A practical feature of the invention is that particles more dense than the fluid do not come in contact with the impeller or its environs, so abrasive wear is minimal. This feature can be preserved in continuous operation by locating slurry inlet part 20 away from the impeller region 17.

In a semi-batch operation, it is possible to separate particles according to their size and density, by continuously increasing impeller speed while flowing particle-free fluid into the vessel and removing slurry from port 19. At relatively low impeller speeds the largest and densest particles concentrate in region 18 and can be removed by flow through port 19. Then progressively higher impeller speeds can be used to repeat this operation for progressively smaller and less dense particles.

A modified arrangement of our device as shown diagrammatically in FIG. 4 has two impellers mounted on shafts 15-A and 15-B so as to rotate therewith. These impellers 16-A and 16-B as shown, are located at opposite ends of container 11 and both rotate upon being driven through shafts 15-A and 15-B by driving means 10-A and 10-B. The impellers 16-A and 16-B cause the slurry to be forced radially outward toward the wall 12 where it is directed or convected longitudinally of the container to a location between the impellers 16-A and 16-B, where it collects and moves as does the slurry of region 18 in FIG. 1. The intermediate bed of slurry located between the two impellers gathers there because of the convective flows along the paths indicated by the curved lines 26 in the upper and lower portions of the container of FIG. 4. The longitudinal position of the slurry region 18 depends on the relative speeds of impellers 16-A and 16-B and their geometry.

Dense slurry collected midway of the container of FIG. 4 may be withdrawn from the container through valved outlet 19-A. Water or other fluid, or slurry containing particles less dense than the fluid may be withdrawn from the container through valved outlet 21-A or 21-B in the container.

Except for the inclusion of two impellers in the device and the location of a region 18 at or near the midway point between the spaced impellers, the action of the device of FIG. 4 is the same as, or parallels, the actions described in connection with FIG. 1.

A continuous process may be provided by connecting in series a plurality of containers 11 structured and functioning as described in connection with FIG. 1. A countercurrent process for particles denser than the fluid is illustrated in FIG. 5. Particles flow in the form of a dense slurry from unit 11-A to 11-B to 11-C while particle-free fluid flows in the opposite direction from unit 11-C to 11-B to 11-A. The secondary longitudinal flow within each unit provides intimate contact between fluid and particles. The flows between units are caused by the self-pumping ability of the units; no external pumps are necessary. The above-described process is especially desirable for leaching and washing of particles and for other uses as will be readily recognized by those skilled in the art.

Another useful continuous process can also be formed by modifying the connections between the containers arranged in series in FIG. 5. In this modified version each container has only two port means, one for admitting slurry, and the other for expelling slurry. The expelling port means of unit 11A is connected to the admitting port means of unit 11B; the expelling port means of unit 11B is connected to the admitting port of unit 11C; and so forth throughout the cascade of units. Slurry entering unit 11A thus flows in sequence through units 11B, 11C and passes sequentially through each unit of the cascade without settling in the units and without external pumps between the units. The distribution of residence times of the slurry becomes progressively narrower as the number of units is decreased. The above described arrangement provides nearly uniform holding time for particles in a continuous flow process. This above described process is especially desirable for catalytic or enzymatic reactions as well as reactions where the particles are altered in composition, structure or size.

In an alternate embodiment, the two-impeller arrangement of FIG. 4 is repeated more than once in a single long cylinder. Fluidized beds are generated between pairs of impellers, all of which may be mounted upon a single central shaft. By providing porting and ductwork equivalent to that illustrated in FIG. 5, the advantages of a cascade arrangement may be procured in a single vessel in stacked fashion.

As seen above, the present invention is useful for concentrating and separating particles from slurries where those particles are denser than the carrier liquid. Where the particles are less dense than the liquid, they are subject to a "centrifugal buoyancy" effect which causes their accumulation in a region 24 (FIG. 1) around the impeller. Particles may be removed as a concentrated slurry from wall port 21.

It may be desired to provide ports at other positions for adding or withdrawing slurries or their components, particularly when processing is continuous rather than by batches. One of the advantages of the apparatus, in fact, is that all porting may be done at points well away from the impeller or impellers. By this means, undesirable mechanical contact of the impellers with the particulate matter is avoided or minimized.

In the preferred embodiment, the container is a right circular cylinder. It will be clear that other shapes exist which will permit the necessary flow. In particular, the cylinder may be frustro-conical. If the narrowed portion occurs at the "collection" area, however, the narrowing should not be as great as that employed in cyclones or centriclones, because a substantial volume of collection area 18 should exist. Further, if the container tapers nearly to a point, as in cyclones, the pressure producing characteristics at the pointed end will be degraded, and it may not be practical to obtain the slurry at elevated pressure. We have found that the diameter of the narrowed portion should not be less than a quarter of that of the wider portion, and for many applications at least one half the diameter, or more, is required.

Figure 1A:
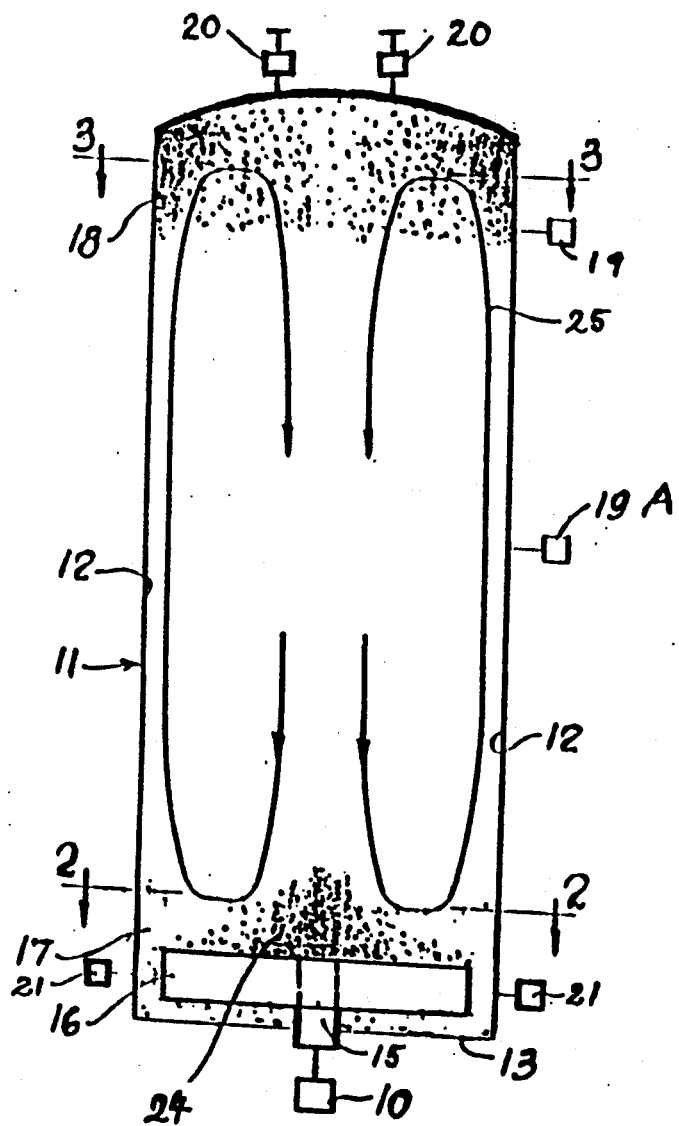
FIG. 1a shows another embodiment having a convex end wall.

The end barrier adjacent to the collecting area is shown as a flat end wall, but it may be spherically dished so as to be outwardly convex as shown in FIG. 1a. In that case the height of the center of the dish above the level of its perimeter should be no more than the radius of the container at that level, to avoid the disadvantages listed above.

The cross-sectional shape of the container need not be exactly round, but its out-of-roundness, if any, cannot be too great. In particular, any appreciable interior baffling will generate turbulence, as is well known in the mixing art. Observations indicate that an out-of-roundness in the range of 2–5% is the most that can be tolerated for the usual ranges of impeller speed and viscosity.

The container should preferably have a length about three times its diameter. If the length-to-diameter ratio is less than one, mixing is likely to occur in slurries of lower viscosity. If it is greater than about ten, it will be difficult to get the swirling and convection currents to the end away from the impeller. Particle concentration will be poor, and the pumping action lessened because the slurry will be stagnant at the far end. However, if the container is tapered to narrow at the collecting area, it may be longer.

As with cyclones, the apparatus may be of any practicable size, with the smaller sizes being more appropriate for slurries of finer particles.

A wide range of impeller shapes and sizes appear to be workable. Among those are ones with from 2 to 12 blades, flat blades, pitched blades which pump upward and pitched blades which pump downward, diameters from 0.4 to 0.99 of the diameter of the cylinder, and blade widths from 0.05 to 2.0 of the blade diameter.

A spiralling arm impeller, rotating in the direction which minimizes pumping, is superior for trapping very fine particles. It is very much preferred to provide that the impeller speed is independently controllable; without this feature the apparatus loses much of its versatility.

The use of the described apparatus for concentration and separation of particles has been discussed. Many other applications exist, some of which follow.

One type of application is the sorting of a mixture of particles. A feature of the invention is its use for at least two kinds of sorting: first, the sorting by size (classification) of particles of the same material, and second, the sorting by specific gravity of particles of different materials.

The principal forces on a particle carried by a fluid being processed and the variables affecting them, are these (we will assume the particle's density is substantially greater than that of the carrier fluid):

(1) $F_c$, centrifugal force, a function of the particle's mass, its position and its angular velocity
(2) $F_g$, gravitational force, a function of the particle's mass
(3) $F_d$, convective forces (drag), a complex function but most strongly affected by the fluid's velocity and viscosity and the particle's surface area.

For simplification, assume the angular velocity of a particle and the fluid velocity are roughly proportional to the impeller angular velocity which we will call w. Assume the particle trapping region is small. The convective force, that is, the drag on a particle held immobile against the convective current, is proportional to a drag coefficient, the fluid density, the square of the fluid velocity and the surface area of the particle. The drag coefficient is inversely proportional to the particle Reynolds number in the laminar flow regime and is a constant in the turbulent regime. Call the particle's volume V and the fluid's viscosity v, and let the particle's density minus the fluid's density be called D. A particle will be carried to the top of the container if the net gravitational force on it is less than the convective force, and it will be trapped there if the convective force is less than the net centrifugal force in the trapping region. I.e., to a crude approximation the condition for separation is $$K_1 VD < K_2 v^{(1-p)} V^{(1+p)/3} w^{(1+p)} < K_3 VDw^2 \quad (1a)$$

where $0 \leq p \leq 1$, $p \to 0$ for laminar flow of fluid over the particles and $p \to 1$ for turbulent flow of fluid over the particles; $K_1$, $K_2$, and $K_3$ are parameters independent of the variables shown explicitly in (1a). The speed and efficiency of the separation depends on the strength of the inequalities. Condition (1a) can be alternatively stated as $$K_1 < K_2 v^{(1-p)} V^{(-2+p)/3} D^{-1} w^{(1+p)} < K_3 w^2 \quad (1b)$$

The first inequality involving $K_1$ and $K_2$ insures the suspension of particles. Clearly, for any fluid viscosity v, any particle volume V, and any density difference D between particles and fluid, this inequality is easily satisfied by stirring faster, i.e., by increasing w.

The second inequality involving $K_2$ and $K_3$ insures that the particles will be trapped and not dispersed throughout the fluid. This condition can be expressed as $$V^{(-2+p)/3} D^{-1} < K_3' v^{(-1+p)} w^{(1-p)} \quad (2)$$

For laminar flow, where $p \to 0$, $$V^{2/3} D > K_3'' v/w \quad \text{(laminar flow over particles)} \quad (3)$$

Thus, for any particle volume V, density difference D between particles and fluid, and any fluid viscosity v, the particles can be dynamically trapped by increasing the stirrer rotating rate w. The requirement that the regime of flow over the particles be laminar is met in practice over a wide range of operating conditions for many practical systems.

However, as the particle volume V and/or density difference D become very small, the above criterion requires such a large stirrer rotating rate w that the flow over the particles eventually becomes turbulent, and the above criterion no longer applies. In the limiting regime of turbulent flow over the particles $$V^{.66} D > K_3''' \quad \text{(turbulent flow over particles)} \quad (4)$$

The left-hand side of this inequality represents the condition on particle size and density beyond which faster stirring is ineffective in trapping small/lighter particles, i.e., the condition on the smallest, lightest particles which can be trapped dynamically.

A particular feature of the apparatus explained by condition (3) is that there is a critical value of particle volume V and density difference D between the particle and fluid $$(V^{\frac{1}{3}}D)_{critical} = K_3'' v/w \quad (5)$$

which depends on stirrer rotating speed w such that particles which have $$V^{\frac{1}{3}}D > (V^{\frac{1}{3}}D)_{critical}$$

will be trapped, and particles which have $$V^{\frac{1}{3}}D < (V^{\frac{1}{3}}D)_{critical}$$

will remain untrapped. Thus, for example, a mixture of particles can be substantially fractionated in time sequence according to their values of $V^{\frac{1}{3}}D$, which is proportional to their sedimentation rates, by sequentially increasing the stirrer rotating speed and removing each incrementally trapped fraction.

If particles with a range of densities and volumes are trapped according to criterion (3) or (5), there will be a continuous gradation of trapped particles in the radial direction according to their $V^{\frac{1}{3}}D$ values, with the particles of larger $V^{\frac{1}{3}}D$ being located at higher values of radial position. This gradation is explained primarily by the gradient in centrifugal force existing over the circumferential flow boundary layer adjacent to the cylindrical vessel wall.

Thus, in addition to sequential fractionation of particles according to their values of $V^{\frac{1}{3}}D$ as described above, simultaneous fractionation is possible through several draw-off ports spaced radially one from another.

An alternate procedure for separation by density, useful when there are two different density ranges of particles present, is to adjust the density of the carrier fluid to an intermediate value, for example, by adding very fine particles of a high density, as is done in heavy media separation. The denser range will then separate out at region 18 of FIG. 1 and the lighter range at region 24. By this means, for example, it may be possible to purify coal, ores, or the like, contaminated with a variety of lighter or heavier materials.

A family of useful applications of the invention is derived from the fact that the particle bed need not be removed from the container as it is generated. Indeed, it may be used as a means to contain particles for further processing with the convected fluid. Uses include washing the particles, leaching them, dissolving them or permitting them to react with constituents of the fluid. For example, the extraction of finely ground coffee has been performed with far greater economy and efficiency in the present device than with many prior art devices, and the extraction of tea is similarly possible. A further and related application is the separation of one or more components from the fluid by absorption or adsorption to the particles, as for example is currently done in columnar packed beds. For these processes, the cascade arrangements described in the discussions of FIGS. 4 and 5 will be seen to be especially useful.

The use of a fluidized bed for controlling reactions on the surface of the particles should be productive. This could include either reactions entered into with the particulate material itself, or reactions catalyzed by either the particulate material itself or by, for example, enzymes carried on its surfaces. One advantage is that if gaseous products are created in a liquid carrier, they may be rapidly removed from the liquid by porting in region 24.

The invention is also useful for gas-liquid systems, including cases where it is desired to disperse or dissolve a gas rapidly into a liquid such as in fermentation or hydrogenation processes. When a portion of the liquid in FIG. 1 is replaced by gas, the gas-liquid interface forms a vortex as is well-known at low agitator speeds. As the speed increases, the vortex approaches a cylindrical core; at a sufficiently high speed, the gas is sucked into the impeller region and forms a highly dispersed two-phase mixture similar to the two phase mixture which is trapped at the impeller when low density solid particles are present in a higher density liquid. The gas-liquid mixture trapped in the impeller region is subjected to high shear and has large gas-liquid interfacial area. The gas bubbles cannot coalesce and escape from the impeller region; they are convected together with liquid radially outward, but the centrifugal field causes them to flow radially inward to the centerline where they are re-entrained with liquid into the eye of the impeller, in region 24 of FIG. 1. The small size of the bubbles and the continuous interchange of liquid favor unusually high rates of mass transfer.

The invention is also useful for three-phase systems such as those containing a gas, a liquid, and particles more dense than the liquid. One such system which benefits from several features of the invention is triple-point crystallization, a continuous process which may be used for separating carbon dioxide from hydrogen sulfide and other contaminants found in crude gas streams made by gasifying coal. For example, it may be desired to purify a liquid consisting of primarily carbon dioxide in which impurities such as hydrogen sulfide, carbonyl sulfide, sulfur dioxide, ethane, ethylene, propane, propylene, and other less volatile impurities are dissolved. A version of the apparatus having an inlet port for the impure liquid, and two outlet ports, one for gaseous product and one for solid particles in slurry form, is prepared. The impeller is rotated at a speed sufficient to produce a vortex extending from the center of the top wall and down part way into the center of the liquid. The impeller speed should not be high enough to suck the gas farther down into the impeller region. The inlet port can be located anywhere, the gas removal port is advantageously located on the centerline, in the end plate farthest from the impeller, and the slurry outlet port is advantageously located in the cylinder wall adjacent the end wall farthest from the impeller. A pressure controller such as a back-pressure regulator is in the gas removal port. This back-pressure regulator is set to open whenever the pressure exceeds a pressure which is slightly below the triple point pressure of the liquid mixture. In the case of relatively pure carbon dioxide, which has a triple point of 5.11 atmospheres, a suitable setting is 4.5–5.05 atmospheres. As the inventory of liquid is depleted, as will be described shortly, fresh liquid feed is introduced to maintain the liquid inventory.

The basic process has been previously described for packed beds (Liu, et al., Triple-Point Crystallization Separates and Concentrates Acid Gases; Paper No. 52A, (Mar. 27–31, 1983, Houston, Texas Meeting) available from American Inst. of Chem. Engineers, 345 E.

47th St., New York, N.Y., 10017). As the unit operates, liquid evaporates to form gas. The heat of vaporization is supplied from the liquid which cools. When the triple point temperature is reached, the cooling due to continued vaporization causes crystals of carbon dioxide to form. These crystal particles are more dense than the liquid.

Gas relatively free of entrained liquid and solid is removed from the gas core by the gas removal port. Crystal solids in slurry form are removed in the cylindrical wall port adjacent the end of the vessel farthest from the impeller. By virtue of the centrifugal force field and the stagnation of the swirling flow, the pressure at this port, particularly if it is tangential, is elevated from the pressure in the gas core.

The invention enables high rates of throughput, gaseous product relatively free of liquid and solid, and a pressurized slurry output. The pressurized slurry can be delivered to another vessel without vapor formation by maintaining the pressure in the entry port to the second vessel slightly above the triple point pressure, but below the pressure of the port in the wall region of the sending vessel. Alternatively, the slurry can be fed to the inlet of a pump which then can produce a high pressure without cavitation due to boiling in the inlet of the pump or within the pump.

This method of carrying out triple-point crystallization is particularly useful for fluids which have appreciable triple point pressures. These include carbon dioxide, sulfur hexafluoride and uranium hexafluoride.

It will be clear to those skilled in the art that the invention will find application for many examples involving two or more mutually immiscible phases with appropriately differing densities. In particular, two immiscible liquids might be separated or exposed to each others' actions. In general, when "particles" are referred to herein, the term may mean not only particles of a solid but any immiscible liquid or gas in dispersed form in a carrier fluid.

EXAMPLES

I. Concentration and Separation of Fine Mineral Particles

In a separation experiment on small mineral particles, 54.37 grams of alumina particles were placed in a 2 inch diameter by 9 inch long vessel. The agitator had two flat blades and was 1.5 inches in diameter and 0.875 inches wide. The clearance between the agitator and the vessel end plate was 0.3125 inches. These particles were sieved from a larger sample and all of the particles passed through a 45 micron screen. The specific gravity of the particles was about 2.4.

At 7,000 rpm, 86.4% of the particles by mass concentrated at the end of the fluidizer away from the impeller, and 13.6% by mass of the particles remained fluidized throughout the vessel. The distribution of particle sizes in the feed was obtained by a Sedigraph particle size analyzer. The size distribution of the particles which remained suspended throughout the fluid, i.e., the particles which did not concentrate, was also obtained. Most of those particles were in the 5-10 micron range. Less than 15% of the particles in each size range remained dispersed, except for particles in the 5-10 micron range, where 50% of the particles remained dispersed. In every size range, except 5-10 microns, most of the particles collected at the end of the vessel farthest from the impeller.

In the following table, the percent of particles trapped in each size range is given. A reasonable conclusion is that the particles larger than about 10 microns are trapped and concentrated. For particles larger than 20 microns, the separation is nearly complete. By reducing the fluidizer size and increasing the impeller speed, it is expected that separation of particles down to one micron may be achieved.

| PERCENT RECOVERY IN REGION 18 BY SIZE RANGE | |
|---|---|
| SIZE (MICRONS) | RECOVERY (%) |
| 0-5 | 72.9 |
| 5-10 | 49.3 |
| 10-15 | 77.1 |
| 15-20 | 80.0 |
| 20-25 | 94.4 |
| 25-30 | 97.5 |
| 30-35 | 98.9 |
| 35-40 | 99.2 |
| 40-45 | 97.8 |
| 45-50 | 97.5 |
| 50-55 | 100.0 |
| 55-60 | 100.0 |
| 60-65 | 100.0 |

II. Concentration of Light Particles

An experiment was conducted with light particles. Styrofoam particles were shaved from a styrofoam block; they had a particle size of approximately 0.5 mm. The density of the particles was measured to be approximately 0.02 g/cc. The styrofoam particles were placed in a six-inch acrylic impeller fluidizer. The vessel was 6 inches in diameter ×18 inches long. The impeller had three flat blades, diameter 4.0 inches, 1.5 inches high. The clearance between the impeller and the end plate at the impeller end of the vessel was 0.3125 inches. Upon agitation, the particles were drawn down from the top of the unit through the core. These particles collected in a cloud around the spinning agitator at 2,000 rpm. The particles could be removed as a slurry by self-pumping through a port in the curved wall at the level of the impeller.

III. Effect of Alternate Impellers on Separation

A four-inch diameter ×12 inch long acrylic impeller fluidizer was used to test the separation of particles within the fluidizer using different impellers. Four 3 inch impellers were used in the testing. One impeller had six flat blades, one had six curved blades, one had six blades pitched at a forty-five degree angle, and one had three flat blades. Tests were performed at 1700 and 3500 rpm. The particles used in the fluidization were a sub-106 micron alumina. Mass balance calculations were performed to determine the percentage of particles remaining in the lower layer (lights) of the fluidizer.

| PERCENT OF SAMPLE NOT SEPARATED INTO UPPER REGION (REGION 18) | | |
|---|---|---|
| | % NOT SEPARATED | |
| IMPELLER | 1700 RPM | 3500 RPM |
| 1 | 4.50 | 2.70 |
| 2 | 3.72 | 1.07 |
| 3 | 9.17 | 2.23 |
| 4A | 6.88 | 1.63 |

-continued

PERCENT OF SAMPLE NOT SEPARATED INTO UPPER REGION (REGION 18)

| IMPELLER | % NOT SEPARATED | |
|---|---|---|
| | 1700 RPM | 3500 RPM |
| 4B | — | 2.62 |

NOTES ON IMPELLERS
Impeller 1 had six flat blades (⅛ inch wide).
Impeller 2 had six spiral-armed blades (⅛ inch wide) and tests were conducted with the blades cutting into the fluid.
Impeller 3 was the three-bladed propeller (⅛ inch wide) and tests were conducted with the fluid pumping upward toward region 18.
Impeller 4A had six (⅛ inch wide) blades pitched at a forty-five degree angle and tests were conducted with the fluid pumping downward away from region 18.
Impeller 4B had six (⅛ inch wide) blades pitched at a forty-five degree angle and the test was conducted with the fluid pumping upward toward region 18.

Although this invention has been described in is preferred forms with a certain degree of particularity, it is to be understood that the present disclosure of the preferred forms has been made only by way of example and that numerous changes in the details of construction and arrangement of parts may be resorted to without departing from the spirit and scope of the invention as hereinafter claimed.

What is claimed is:

1. Apparatus for the treatment of particles, comprising
   a container having an axis and a sidewall surrounding said axis;
   impeller means located in said container at a first position along said axis and rotatable upon said axis; and
   barrier means located in said container at a second position along said axis, to interrupt flow parallel to said axis of fluids flowing within said container;
   said sidewall having generally circular cross-section at first and second positions, and all intermediate positions, along said axis and with said axis at the circular center, and said sidewall cross-section surrounding said axis at said second position having a diameter no less than one-quarter of the diameter of said sidewall cross-section surrounding said axis at said first position; and
   said container lacking baffle means, and said impeller means and barrier means being sufficiently separated with respect to each other, that rotation of said impeller generates in said fluid a circulating current, said current having a positive component of rotational flow about said axis everywhere oriented in the direction of said rotation of said impeller, and having a positive component of axial flow toward said impeller in the vicinity of said axis and a positive component of axial flow away from said impeller in the vicinity of said sidewall, and that for at least one combination of a particle, fluid and impeller speed, when said particle and said fluid are put in said container and said impeller means is rotated at said impeller speed, said current will carry said particle to the vicinity of said barrier means, where said particle will separate from said current and remain in said vicinity of said barrier means; and further comprising
   first port means for the introduction into said container of fluids and particles, and second port means for the a withdrawal from said container of fluids and particles, said second port means being located upon said sidewall.

2. The apparatus of claim 1 and further comprising variable control means to rotate said impeller means at any desired one of a number of different speeds.

3. The apparatus of claim 1 and in which said sidewall cross-section surrounding said axis at said second position has a diameter no less than one-half of the diameter of said sidewall cross-section surrounding said axis at said first position.

4. The apparatus of claim 1 and in which said sidewall cross-section surrounding said axis at said second position has a diameter substantially equal to the diameter of said sidewall cross-section surrounding said axis at said first position.

5. The apparatus of claim 1 and in which said barrier means comprises end wall means lying in a plane perpendicular to said axis.

6. The apparatus of claim 1 and in which said barrier means comprises generally curved end wall means which are convex as viewed from the outside of said container.

7. The apparatus of claim 1 and further comprising second impeller means located in said container at a third position along said axis and rotatable upon said axis, and in which said barrier means comprises fluid convectively flowing in a radial direction as a result of rotation of said second impeller means.

8. The apparatus of claim 1 and in which said second port means comprises first outlet port means in the vicinity of said barrier means.

9. The apparatus of claim 8 and further comprising second outlet port means in the vicinity of said impeller on said sidewall.

10. The apparatus of claim 1 and further comprising a second said apparatus of claim 1, and feed means to feed said particles from said first apparatus through said first port means of said second apparatus.

11. The apparatus of claim 10 and further comprising pumping means for feeding said particle and said fluid between said apparatus and said second apparatus, said pumping means consisting of said impellers.

12. A method of pumping a fluid having particles contained therein, which particles are more dense than said fluid, comprising
    delivering said fluid and particles to a first location in a container having an axis and a sidewall surrounding said axis, said container having impeller means therein and said first location being substantially removed from the vicinity of said impeller means;
    generating with said impeller a current in said fluid and particles, said current having a positive component of rotational flow about said axis everywhere oriented in the same angular direction, and having a positive component of axial flow toward said impeller in the vicinity of said axis and a positive component of axial flow away from said impeller in the vicinity of said sidewall, and said current subjecting said fluid and particles to centrifugal and convective forces, which forces act to prevent said particles from entering said vicinity of said impeller; and
    permitting either said fluid and particles, or said fluid, or both, to flow from a second location in said container, as a result of head pressure developed in said second location by said current.

13. The method of claim 12 and in which said second location is at a side wall of said container.

14. The method of claim 12 and in which said container is the apparatus of claim 1.

15. A method of exposing to the action of a fluid particles more dense than said fluid, said method comprising the steps of
   (A) adding said fluid to a container having impeller means therein;
   (B) adding said particles to said container;
   (C) generating with said impeller means a current in said fluid which subject said particles to centrifugal and convective forces, which forces act in different directions in a region of said container removed from said impeller, resulting in the formation of a well-defined and localized fluidized bed of said particles in said region of said container removed from said impeller; and
   (D) maintaining the existence of said current through said region so that said particles in said fluidized bed are exposed thereby to said fluid.

16. The method of claim 15 and in which said particles bear on their surfaces a substance desired to be removed, and said action of said fluid is to remove said substance.

17. The method of claim 15 and in which said particles bear a first substance to be chemically reacted either with said fluid or with a second substance carried by said fluid.

18. The method of claim 15 and in which said particles bear a substance capable of catalyzing a chemical reaction within said fluid.

19. The method of claim 15 and in which said particles are capable of sorbtively separating a component of said fluid from said fluid.

20. A method of exposing to the action of a first fluid a second fluid, said second fluid being either a gas or a liquid immiscible in said first fluid, and being less dense than said first fluid, said method comprising the steps of
   (A) adding said first fluid to a container having impeller means therein;
   (B) adding said second fluid to said container;
   (C) generating with said impeller means a current in said first fluid which subjects said second fluid to centrifugal and convective forces, which forces act in different directions in a region of said container near said impeller, resulting in the formation of a well-defined and localized fluidized bed of a dispersed phase of said second fluid remaining in said region of said container near said impeller; and
   (D) maintaining the existence of said current through said region so that said dispersed phase in said fluidized bed is exposed thereby to said first fluid.

21. The method of claim 20 and in which said second fluid comprises a substance to be dissolved in said first fluid.

22. A method of exposing particles to the action of a fluid, comprising
   exposing said particles to the action of said fluid in a first one of a plurality of containers according to the method of claim 15,
   transferring said particles contained in said fluidized beds from said first container to a next and continuing thus in a linear order, and
   transferring portions of said fluid from one container to the next in the reverse order from the said linear order.

23. A method of exposing particles to the action of a fluid, comprising
   exposing said particles to the action of said fluid in a first one of a plurality of containers according to the method of claim 15;
   transferring said particles and fluid, without the aid of an external pump, from said first container to a second container, and continuing thus sequentially.

24. A method of exposing particles to the action of a fluid, comprising
   providing a plurality of first through $n^{th}$ containers having first through $n^{th}$ impeller means therein,
   providing a plurality of first through $n^{th}$ volumes of said fluid, containing first through $n^{th}$ portions of said particles, in said first through $n^{th}$ containers,
   exposing each $k^{th}$ portion of said particles, where $1 < k < n$, to the action of said $k^{th}$ volume of fluid in said $k^{th}$ container according to the method of claim 15,
   transferring each said $k^{th}$ portion of said particles contained in said fluidized bed, from said $k^{th}$ container to said $(k+1)^{th}$ container,
   transferring each $(k+1)^{th}$ volume of fluid from said $(k+1)^{th}$ container to said $k^{th}$ container,
   transferring said first volume of fluid from said first container, transferring said $n^{th}$ portion of said particles from said $n^{th}$ container, providing an additional portion of said particles to said first container and providing an additional volume of said fluid to said $n^{th}$ container.

25. The method of claim 24 and in which all said transferring steps are performed in a continuous fashion.

26. A method of exposing particles to the action of a fluid, comprising
   providing a container having a plurality of impeller means therein such that said impeller means may be rotated to generate a plurality of separate currents capable of forming a plurality of localized fluidized beds of particles in said container;
   exposing said particles to the action of said fluid in said container according to the method of claim 15, so that a portion of said particles are contained in one of said fluidized beds; and
   transferring said portion of said particles from said one of said fluidized beds to another of said fluidized beds.

27. A process for exposing particles to the action of a fluid, said process comprising
   introducing said particles, along with a fluid, into a vessel having an axis and a sidewall surrounding said axis and having impeller means therein, and
   rotating said impeller at a sufficient impeller speed to bring about in said fluid a circulating current, said current having a positive component of rotational flow about said axis everywhere oriented in the same angular direction, and having a positive component of axial flow toward said impeller in the vicinity of said axis and a positive component of axial flow away from said impeller in the vicinity of said sidewall, and
   said impeller speed, vessel and fluid being chosen such that substantially all of said particles will tend to occupy and remain in only a portion of said vessel as a result of the interaction of convective and centrifugal forces generated by said circulating current upon said particles.

28. a process for separating and pumping particles, said process comprising
   introducing said particles, along with a fluid, into a vessel having an axis and a sidewall surrounding said axis and having impeller means therein, and
   rotating said impeller at a sufficient impeller speed to bring about in said fluid a circulating current, said current having a positive component of rotational flow about said axis everywhere oriented in the same angular direction, and having a positive component of axial flow toward said impeller in the vicinity of said axis and a positive component of axial flow away from said impeller in the vicinity of said sidewall, said impeller speed, vessel and fluid being chosen such that a portion of said particles will tend to occupy and remain in a first portion of said vessel as a result of the interaction of convective and centrifugal forces generated by said circulating current upon said particles, and removing a subportion of said portion of said particles from said first portion of said vessel due to pressure induced by centrifugal force generated by said rotation of said impeller; and removing a portion of said fluid from a second portion of said vessel, distinct from said first portion of said vessel, due to pressure produced by centrifugal force generated by said rotation of said impeller.

* * * * *